United States Patent [19]
Alterman et al.

[11] Patent Number: 6,137,994
[45] Date of Patent: Oct. 24, 2000

[54] RADIO COMMUNICATION SYSTEM AND METHOD FOR SETTING AN OUTPUT POWER OF A BASE SITE THEREIN

[75] Inventors: Steven S. Alterman, Davie; Orestes G. Melgarejo; Mauricio E. Sanchez, both of Pembroke Pines, all of Fla.

[73] Assignee: Motorola, Inc., Schaumburg, Ill.

[21] Appl. No.: 09/087,165

[22] Filed: May 29, 1998

[51] Int. Cl.[7] .................................................. H04B 1/00
[52] U.S. Cl. ............................................. 455/69; 455/522
[58] Field of Search ............................. 455/69, 504, 505, 455/512, 513, 524, 525, 67.1, 67.6, 70, 71, 561, 571, 574, 115, 522, 67.4, 446, 423, 11.1, 453, 63, 502, 503; 370/342, 209

[56] References Cited

U.S. PATENT DOCUMENTS

| | | | |
|---|---|---|---|
| 4,771,448 | 9/1988 | Koohgoli et al. ........................ | 455/450 |
| 5,386,589 | 1/1995 | Kanai . | |
| 5,461,639 | 10/1995 | Wheatley, III et al. ................. | 370/342 |
| 5,519,759 | 5/1996 | Heineck et al. ......................... | 455/422 |
| 5,548,812 | 8/1996 | Padovani et al. ........................ | 455/442 |
| 5,574,975 | 11/1996 | Hill ........................................... | 455/503 |
| 5,710,980 | 1/1998 | Ueda ....................................... | 455/67.4 |
| 5,884,187 | 3/1999 | Ziv et al. ................................. | 455/522 |
| 5,956,649 | 9/1999 | Mitra et al. .............................. | 455/522 |
| 6,006,296 | 12/1999 | Trompower ............................. | 455/456 |
| 6,073,025 | 6/2000 | Chheda et al. .......................... | 455/522 |

Primary Examiner—William G. Trost
Assistant Examiner—Jean A. Gelin
Attorney, Agent, or Firm—Daniel C. Crilly; Jeffrey K. Jacobs

[57] ABSTRACT

A radio communication system (100) employs a method for setting an output power of a base site (e.g., 107) in the system. The radio communication system includes at least two base sites (101–107) and a communication path (109, 131–137) coupling the base sites together. A first base site (e.g., 107) transmits a signal (147) via a radio communication resource. A second base site (e.g., 101) receives the signal and determines a signal quality metric of the received signal. Upon determining the signal quality metric, the second base site generates and conveys a message to the first base site via the communication path, wherein the message instructs the first base site to adjust an output power of the first base site. The first base site then adjusts its output power responsive to the message.

20 Claims, 2 Drawing Sheets

RADIO COMMUNICATION SYSTEM AND METHOD FOR SETTING AN OUTPUT POWER OF A BASE SITE THEREIN

FIELD OF THE INVENTION

The present invention relates generally to multiple base site radio communication systems and, in particular, to setting an output power of a base site in such a system.

BACKGROUND OF THE INVENTION

Radio communication systems are known to include fixed infrastructure networks and mobile or portable radio communication units. One such radio communication system is a cellular communication system. In cellular communication systems, the fixed infrastructure network typically includes a plurality of base sites, a base site controller (BSC), and a mobile switching center (MSC). Each base site provides communication service to a respective service coverage area generally referred to as a cell. The geographic size of each cell is determined theoretically prior to system installation by system designers and is generally established by the height placement of the base site antenna and the output power of the base site transmitters. In some cellular systems, base monitor radios (actually portable radio communication units) are included at each base site to monitor the output power of the respective base site in order to insure that the output power does not exceed the theoretically-determined maximum.

As noted above, system designers determine base site antenna height and base site output power to provide satisfactory communication service to a particular service coverage area. Such calculations are typically based on measured propagation losses for the system. To measure propagation losses, the system designers set up a test system in the desired geographical area of the actual system and measure the signal strength of received test signals in accordance with known techniques. However, such propagation measurements are generally performed during normal weather conditions for the area (e.g., partly sunny day with moderate humidity) and, depending on what time of year and in what portion of a particular country the measurements are made, may not include the effects of changes in terrain, such as fully-bloomed or snow-covered trees or a newly-constructed building. Consequently, when changes in weather conditions or terrain occur, so-called "holes" or "gaps" in communication service may result in a cell due to greater than expected propagation losses caused by the change in weather or terrain.

Therefore, a need exists for a radio communication system and method of setting an output power of a base site therein that provides dynamic adjustment of base site output power to take into account changing weather and terrain conditions, thereby providing improved communication service to users in the system.

DESCRIPTION OF A PREFERRED EMBODIMENT

Generally, the present invention encompasses a radio communication system and a method for setting an output power of a base site contained in the radio communication system. The radio communication system includes at least two base sites and a communication path coupling the base sites together. A first base site transmits a signal via a radio communication resource. A second base site receives the signal and determines a signal quality metric of the received signal. Upon determining the signal quality metric, the second base site generates and conveys a message to the first base site via the communication path, wherein the message instructs the first base site to adjust an output power of the first base site. The first base site then adjusts its output power responsive to the message. By setting the output power of the first base site in this manner, the present invention provides a feedback loop between base sites to enable each base site to transmit at the power level necessary to provide communication service to its entire service coverage area, regardless of the particular weather or terrain conditions.

Figure 1:
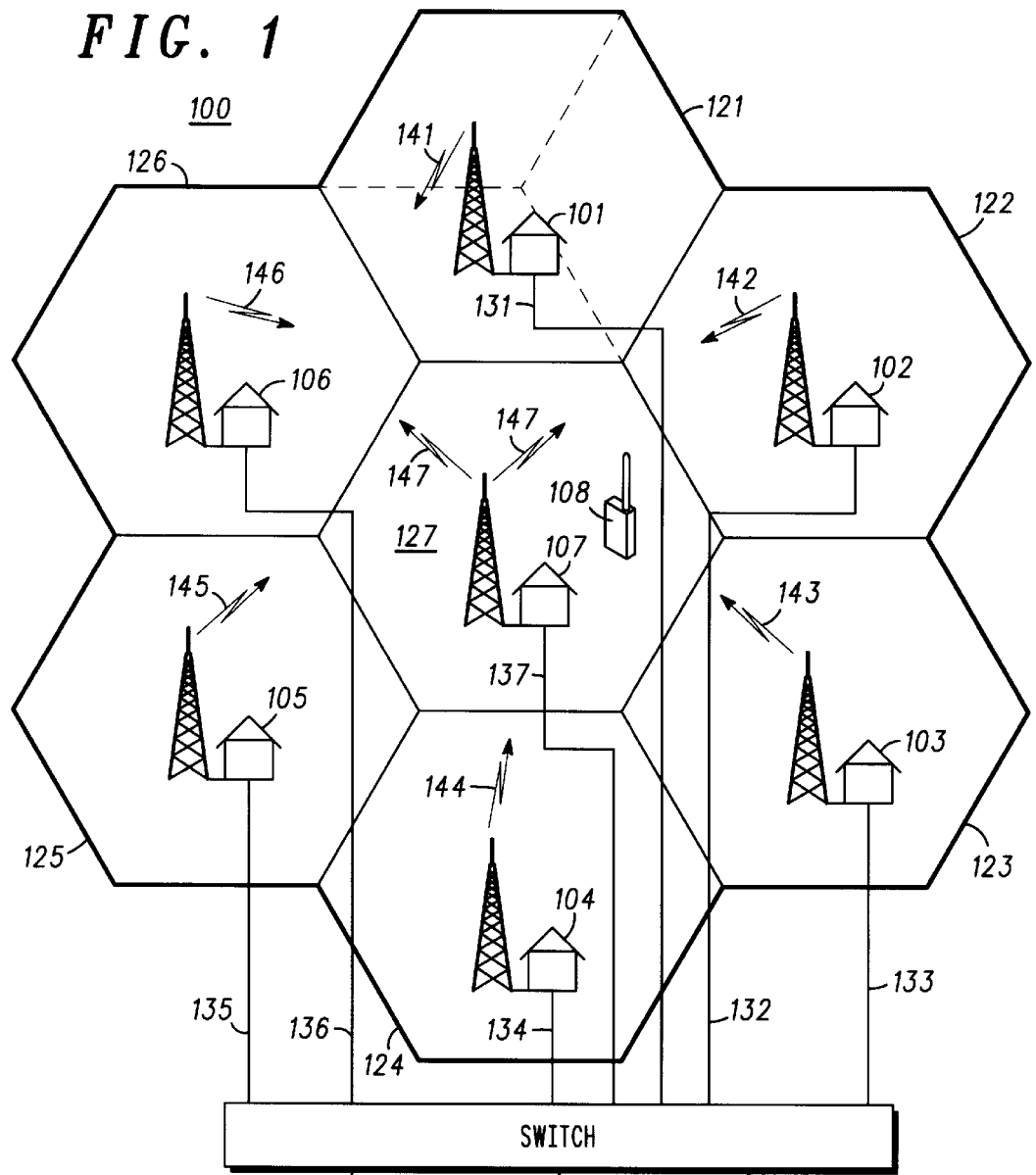
FIG. 1 illustrates a block diagram depiction of a radio communication system in accordance with a preferred embodiment of the present invention.
Figure 2:
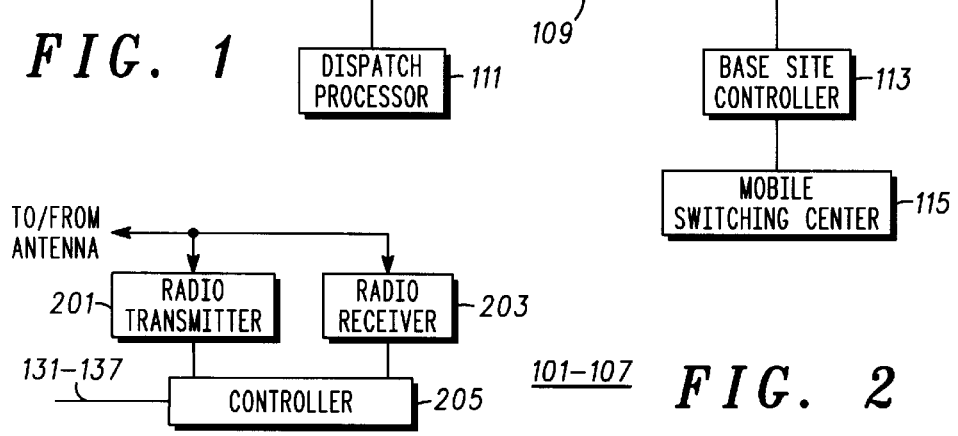
FIG. 2 illustrates a block diagram depiction of elements of a base site in accordance with the preferred embodiment of the present invention.
Figure 3:
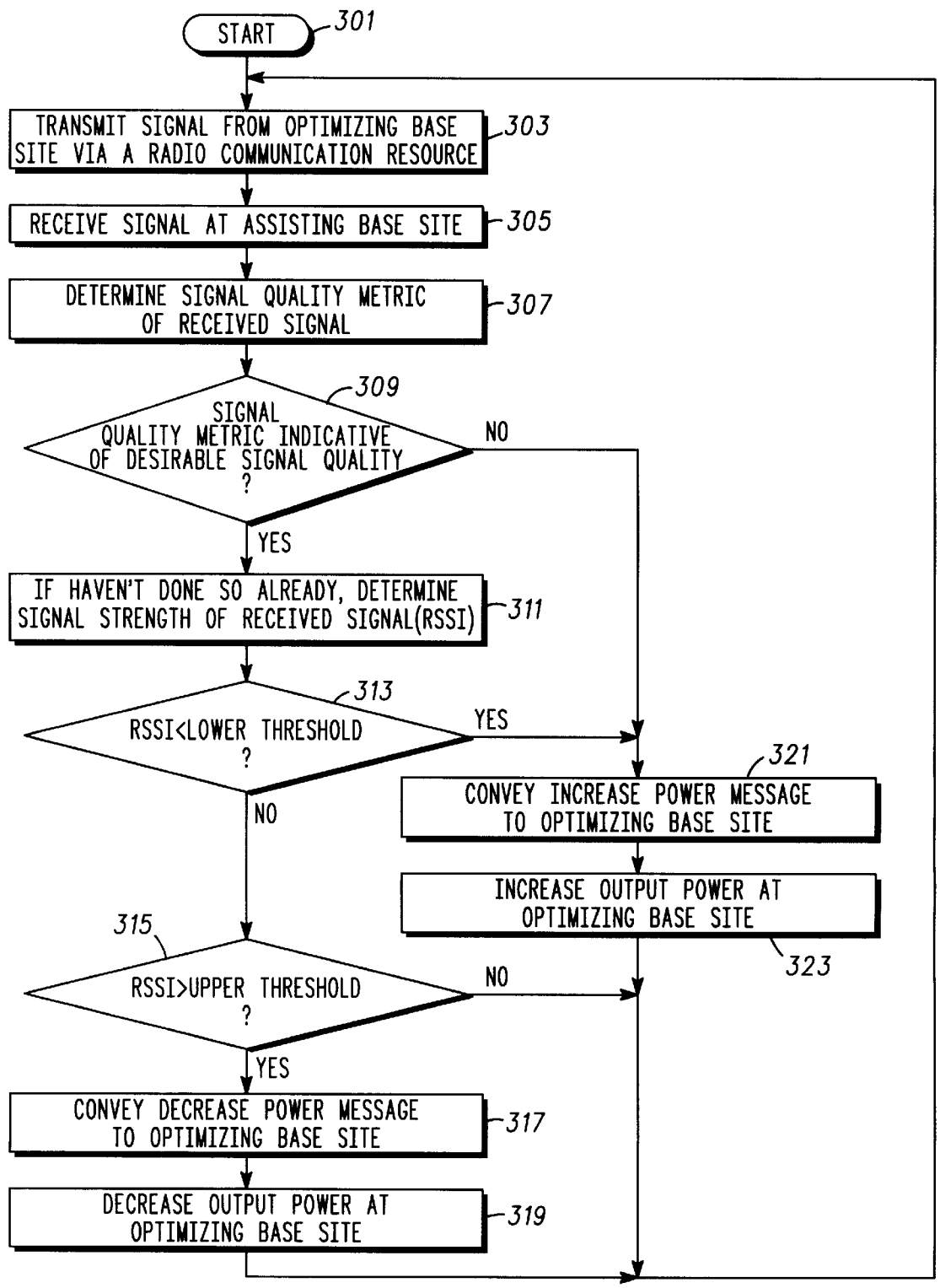
FIG. 3 illustrates a logic flow diagram of steps executed by an optimizing base site and at least one assisting base site to set an output power of the optimizing base site in accordance with the preferred embodiment of the present invention.

The present invention can be more fully understood with reference to FIGS. 1–3. FIG. 1 illustrates a block diagram depiction of a radio communication system 100 in accordance with a preferred embodiment of the present invention. The preferred radio communication system 100 includes a fixed infrastructure network and at least one radio communication unit 108. The fixed infrastructure network preferably comprises a plurality of base sites 101–107, a switch 109, a dispatch processor 111, a base site controller (BSC) 113, and a mobile switching center (MSC) 115. As depicted, the preferred radio communication system 100 comprises an "iDEN" communication system that is commercially available from Motorola, Inc. of Schaumburg, Ill. Accordingly, the base sites 101–107 preferably comprise "iDEN" Enhanced Base Transceiver Sites (EBTSs), the switch 109 preferably comprises an "iDEN" Digital Access Crossconnect Switch (DACS), the dispatch processor 111 preferably comprises an "iDEN" Dispatch Application Processor (DAP), the BSC 113 preferably comprises an "iDEN" BSC, and the MSC preferably comprises an "iDEN" MSC. In an alternative embodiment, the radio communication system 100 might comprise any cellular or cellular-type trunked communication system, such as communication systems that implement one or more of the following cellular platforms: Personal Communication Service (PCS), Advanced Mobile Phone Service (AMPS), Narrowband AMPS (NAMPS), Unites States Digital Cellular (USDC), Code Division Multiple Access (CDMA), or Global System for Mobile Communications (GSM).

As shown, each base site 101–107 provides omnidirectional coverage in its respective service coverage area 121–127. In theory, such coverage enables mobile or portable radio communication units (one shown) located anywhere in the respective service coverage area 121–127 to receive communication signals from the associated base site 101–107. However, for reasons such as changing weather conditions or terrain, such coverage may vary in systems that do not include the present invention. In the preferred embodiment, the base sites 101–107 are coupled together through wireline links 131–137 and one or more switches (one switch 109 is shown).

Each base site 101–107 preferably includes, among other things, the elements depicted in FIG. 2. That is, each base site 101–107 preferably includes a radio transmitter 201, a radio receiver 203, and a controller 205. In the preferred embodiment, the radio transmitter 201 comprises a linear transmitter embodied within a base station; whereas, the radio receiver 203 comprises a digital receiver embodied in the aforementioned base monitor radio, which is located at the base site, but is external to the base station. The radio receiver 203 of a particular base site 107 is preferably designed to receive signals transmitted from all its neighboring or adjacent base sites 101–106 and, in this sense, is a so-called scanning receiver. The controller 205 preferably comprises a microprocessor and a database, and is coupled to the radio receiver 203. The controller 205 may also be coupled to the radio transmitter 201, for example, when both the radio transmitter 201 and the radio receiver 203 are embodied in a base station or, as later described, when a radio communication resource comprises the communication path between the base sites 101–107.

With reference to FIGS. 1 and 2, operation of the preferred radio communication system 100 occurs substantially as follows in accordance with the present invention. Upon establishment of a communication between a first base site (e.g., base site 107) and a communication unit 108, the base site 107 employs its transmitter 201 to transmit a signal 147 to the communication unit 108 via a radio communication resource. As contemplated by the present invention, a radio communication resource might comprise a radio frequency (RF) channel in a frequency division multiple access (FDMA) system, such as AMPS, a time slot on an RF channel in a time division multiple access (TDMA) system, such as an "iDEN" system, or an orthogonal code, such as a pseudo-noise sequence or a frequency-hopping pattern, in a CDMA system.

One or more base sites 101–106 serving respective service coverage areas 121–126 located adjacent to the service coverage area 127 served by the transmitting base site 107 employ their respective receivers 203 to receive the transmitted signal 147. Upon receipt of the signal 147, the radio receiver 203 demodulates the received signal in accordance with known techniques and provides a baseband representation of the received signal to the controller 205. The controller 205 then determines a signal quality metric, such as a received signal strength indication (RSSI), a carrier-to-interference plus noise ratio (C/(I+N)), or a bit error rate (BER), for the received signal in accordance with known techniques.

In addition to the baseband representation of the received signal, the radio receiver 203 provides the controller 205 other information (e.g., base site identification, frequency, time slot, and/or orthogonal code) contained in or pertaining to the received signal to enable the controller 205 to determine which base site 107 transmitted the signal received by the radio receiver 203. Upon receipt of such other information, the controller 205 accesses its database to determine the identity of the transmitting base site 107 by comparing the particular information (e.g., frequency) associated with the received signal to a table of base sites and such information.

Once the controller 205 determines the identity of the transmitting base site 107, the controller 205 compares the signal quality metric with a stored signal quality threshold associated with the transmitting base site 107. When such comparison indicates an undesirable signal quality, the controller 205 generates a control signal that contains a message instructing the transmitting base site 107 to increase its output power. The controller 205 then conveys the control signal to the transmitting base site 107 either via the wireline links 131–137 and the switch 109 (i.e., via the fixed infrastructure network) or via a radio signal 141–146 transmitted over a radio communication resource supported by the transmitting base site 107.

The determination of the desirableness (or undesirableness) of the signal quality is dependent upon the type of signal quality metric. For example, when the signal quality metric is a positively-referenced signal quality metric, such as RSSI or C/(I+N), the comparison indicates an undesirable signal quality when the signal quality metric is less than the signal quality threshold; whereas, when the signal quality metric is a negatively-referenced signal quality metric, such as BER, the comparison indicates an undesirable signal quality when the signal quality metric is greater than the signal quality threshold.

In the preferred embodiment, the signal quality threshold comprises an average of a minimum acceptable signal quality and a maximum acceptable signal quality. By setting the threshold based on such an average, the neighboring base site or sites 101–106 assist the transmitting base site 107 in setting its output power to such a level that frequent output power adjustments are not necessary, thereby mitigating hysteresis and instability in the feedback loop created by the radio communication resource over which the transmitted signal 147 was conveyed, the neighboring base site, and the communication path (whether it be wireline 131–136 through the fixed infrastructure network or wireless via a signal 141–146 transmitted over a radio communication resource supported by the transmitting base site 107) over which the power control message is conveyed to the transmitting base site 107.

In addition to maintaining a signal quality threshold for each neighboring base site, the database of a base site's controller 205 preferably maintains two RSSI thresholds (an upper threshold and a lower threshold) for each neighboring base site 101–107. Thus, each particular base site 101–107 in the preferred embodiment includes a controller 205 having a database that includes a signal quality threshold and upper and lower RSSI thresholds for each base site that provides communication service to service coverage areas adjacent to the particular base site 101–107. For example, the controller 205 of base site 101 includes a database that contains respective signal quality and upper and lower RSSI thresholds for each neighboring base site 102–107. When the base site 101 receives a signal 147 transmitted from a neighboring base site (e.g., base site 107), the base site 101 preferably determines a signal quality metric for the received signal as discussed above and, if the signal quality metric is something other than RSSI, an RSSI of the received signal. Depending on the desirableness of the signal quality indicated by the signal quality metric and the RSSI of the received signal, the base site 101 sends a message via the fixed infrastructure network or a radio communication resource supported by the transmitting base site 107 instructing the transmitting base site 107 to either increase or decrease its output power if such an increase or decrease is necessary.

An increase in output power of the transmitting base site 107 is necessary in the preferred embodiment when either the signal quality metric indicates undesirable signal quality or the signal quality metric indicates desirable signal quality, but the received signal's RSSI is less than the lower RSSI threshold. A decrease in the transmitting base site's output power is necessary in the preferred embodiment when the signal quality metric indicates desirable signal quality, but the received signal's RSSI is greater than the upper RSSI threshold value. A reduction in output power while maintaining acceptable signal quality is desired because it will likely result in less interference produced by the transmitting base site 107 in other service coverage areas, particularly in systems, such as cellular or cellular-type systems, that reuse frequencies to enhance system capacity. Therefore, in sum, the present invention provides a feedback system between base sites to allow a base site to set its output power within a desirable range, while insuring acceptable signal quality as perceived by radio communication units located in the service coverage area of the base site.

Although described above with respect to a radio system 100 containing base sites 101–107 that provide omni-directional coverage in their respective service coverage areas 121–127, the present invention is also applicable to radio systems that contain one or more base sites that provide sectored coverage in their respective service coverage areas (e.g., see dashed lines in service coverage area 121).

In this case, the number of base sites from which a transmitting base site may receive power control signals is reduced due to the directionality of the antennas used in a sectored site. For example, whereas an omni-directional base site might receive power control inputs from six neighboring sites, a base site having three, 120-degree sectors would receive power control inputs from no more than two neighboring base sites for each sector requiring power adjustment. For example, if base site 101 provided communication service to a service coverage area 121 that is divided into three, 120-degree sectors and if the output power of the base site 101 directed into the sector that is adjacent to service coverage areas 126 and 127 required adjustment, then the base site 101 would receive power control inputs from one or more of the base sites 106, 107 that are serving service coverage areas 126 and 127 (i.e., those base sites that are serving service coverage areas adjacent to the sector requiring a power adjustment).

As described above, the present invention provides a technique for setting base site output power dynamically during actual system operation. By utilizing feedback between base sites as described herein, each base site can set its output power to account for changes in weather and terrain conditions (which remain unaccounted for in existing radio communication systems), such that the resulting output power provides acceptable signal quality as perceived by radio communication units located in the service coverage area of the base site and reduced interference as perceived by radio communication units in other service coverage areas.

FIG. 3 illustrates a logic flow diagram 300 of steps executed by an optimizing base site and at least one assisting base site to set an output power of the optimizing base site in accordance with the preferred embodiment of the present invention. The logic flow begins (301) when the optimizing base site (i.e., the base site needing its output power set) transmits (303) a signal via a radio communication resource. An assisting base site (e.g., a base site serving a service coverage area adjacent to the service coverage area served by the optimizing base site) receives (305) the signal and determines (307) a signal quality metric of the received signal. As noted above, the signal quality metric might comprise RSSI, C/(I+N), BER, or some other signal quality indicator.

Upon determining the signal quality metric, the assisting base site determines (309) whether the signal quality metric is indicative of a desirable signal quality. Whether the signal quality metric is indicative of a desirable signal quality depends on the type of signal quality metric that is determined by the assisting base site. When the signal quality metric is a positively-referenced signal quality metric, such as RSSI or C/(I+N), the signal quality metric is indicative of a desirable signal quality when the signal quality metric exceeds a lower threshold value. Accordingly, the signal quality metric is indicative of an undesirable signal quality when the signal quality metric is less than or equal to the lower threshold value. By contrast, when the signal quality metric is a negatively-referenced signal quality metric, such as BER or word error rate, the signal quality metric is indicative of a desirable signal quality when the signal quality metric is less than some upper threshold value. Accordingly, a negatively-referenced signal quality metric is indicative of an undesirable signal quality when the signal quality metric is greater than or equal to the upper threshold value.

When the signal quality metric is indicative of a desirable signal quality, the assisting base site, if it hasn't done so already as part of the signal quality metric determination performed in block 307, determines (311) an RSSI for the received signal. The assisting base site then determines (313) whether the RSSI of the received signal is less than a lower threshold value. When the RSSI is greater than or equal to the lower threshold value, the assisting base site determines (315) whether the RSSI is greater than an upper threshold value. When the RSSI of the received signal is less than or equal to the upper threshold value (i.e., when the RSSI is effectively between the upper threshold and the lower threshold), the assisting base site determines that the output power of the optimizing base site is within an acceptable range and the logic flow continues at block 303. However, when the assisting base site determines (315) that the RSSI of the received signal is greater than the upper threshold, the assisting base site conveys (317) a decrease power message to the optimizing base site. In a preferred embodiment the assisting base site conveys such a message to the optimizing base site via the fixed infrastructure network. However, in an alternative embodiment, the assisting base site might convey the decrease power message to the optimizing base site via a radio communication resource supported by the optimizing base site.

Upon receiving the decrease power message from the assisting base site, the optimizing base site decreases (319) its output power in response to the message. In the preferred embodiment, the amount of the decrease is pre-established to be a particular step down in decibels (dB) of output power (e.g., 1 dB). However, one of ordinary skill will appreciate that other approaches for decreasing output power at the optimizing base site may be utilized. For example, the optimizing base site may use a coarse tune/fine tune approach in which the optimizing base site responds to a first message to decrease output power by decreasing power by 1 dB, responds to a second message to decrease output power by decreasing power by 0.7 dB, and so on until no such decrease power messages are received from the assisting base site. Once the optimizing base site has decreased its output power in response to the decrease power message, the logic flow continues at block 303.

Returning to decision block 313, when the RSSI of the signal received by the assisting base site is less than the lower threshold, the assisting base site conveys (321) an increase power message to the optimizing base site via the fixed infrastructure network or a radio communication resource. Upon receiving the increase power message, the optimizing base site increases (323) its output power in accordance with its power adjustment procedure (e.g. by increasing its output power by 1 dB), and the logic flow continues at block 303. In summary, then, when the signal quality metric of the signal transmitted by the optimizing base site and received by the assisting base site is indicative of a desirable signal quality and the RSSI of the received signal is between an upper and lower threshold, the output power of the optimizing base site is presumed to be within an acceptable range. However, when the signal quality metric is indicative of a desirable signal quality, but the RSSI of the received signal is not between the upper and lower thresholds, the assisting base site instructs the optimizing base site to either increase or decrease its output power depending on whether the RSSI of the received signal is below the lower threshold or above the upper threshold respectively.

Returning to decision block 309, when the assisting base site determines (309) that the signal quality metric of the received signal is indicative of an undesirable signal quality, the assisting base site conveys (321) an increase power message to the optimizing base site. Upon receiving the increase power message, the optimizing base site increases (323) the output power based on its internal power adjustment procedure (e.g., by increasing its output power by 1 dB increments), and the logic flow continues at block 303. Therefore, to summarize the logic flow depicted in FIG. 3, when the assisting base site determines that the signal quality metric of the signal transmitted from the optimizing base site is indicative of a desirable signal quality, the assisting base site instructs the optimizing base site to increase or decrease its output power only if the RSSI of the signal is not between a desired upper or lower threshold. On the other hand, when the signal quality metric of the signal transmitted from the optimizing base site is indicative of an undesirable signal quality, the assisting base site instructs the optimizing base site to increase its output power. In this manner, the present invention provides a feedback mechanism that allows a base site to dynamically adjust its output power to account for variations in propagation loss that may be introduced by changes in weather or terrain conditions.

The present invention encompasses a radio communication system and a method for setting an output power of a base site contained in the radio communication system. With such an invention, a base site's output power can be set in real time to account for variations in weather or terrain conditions, while insuring acceptable signal quality within its service coverage area and mitigating interference caused by the base site in other service coverage areas. Thus, in contrast to existing radio communication systems that do not account for intermittent changes in weather and/or terrain conditions, the present invention accounts for such changes by utilizing a feedback network that employs neighboring base sites to feedback power control messages to the base site in need of having its output power set or reset.

While the present invention has been particularly shown and described with reference to particular embodiments thereof, it will be understood by those skilled in the art that various changes in form and details may be made therein without departing from the spirit and scope of the present invention. For example, the base site that is setting its output power responsive to control messages from one or more neighboring base sites might take into account all messages received before adjusting or setting its output power (e.g., the base site might increase its output power only if a majority of the neighboring sites instruct the base site to do so), instead of taking into account only one such message (e.g., the first power control message to be received).

We claim:

1. A method for setting an output power of a first base site of a plurality of base sites in a radio communication system, the method comprising the steps of:

transmitting, by the first base site, a signal via a radio communication resource;

receiving, by a second base site, the signal to produce a received signal;

determining, by the second base site, a signal quality metric of the received signal;

conveying, by the second base site, a message to the first base site instructing the first base site to adjust an output power of the first base site, the message being based on the signal quality metric; and adjusting, by the first base site responsive to the message, the output power of the first base site.

2. The method of claim 1, wherein the step of conveying comprises the step of:

when the signal quality metric is indicative of undesirable signal quality, conveying a message to the first base site instructing the first base site to increase an output power of the first base site.

3. The method of claim 1, wherein the signal quality metric comprises a received signal strength indication.

4. The method of claim 3, wherein the step of conveying comprises the step of:

when the received signal strength indication is less than a lower threshold value, conveying a message to the first base site instructing the first base site to increase an output power of the first base site.

5. The method of claim 3, wherein the step of conveying comprises the step of:

when the received signal strength indication is greater than an upper threshold value, conveying a message to the first base site instructing the first base site to decrease the output power of the first base site, such that a received signal strength indication of a subsequent signal transmitted by the first base site is between a lower threshold value and the upper threshold value as measured by the second base site.

6. The method of claim 1, wherein the signal quality metric comprises a carrier-to-interference plus noise ratio.

7. The method of claim 1, wherein the step of conveying comprises the step of conveying the message to the first base site via a fixed infrastructure network.

8. The method of claim 1, wherein the step of conveying comprises the step of transmitting the message to the first base site via a radio communication resource supported by the first base site.

9. The method of claim 1, wherein the step of adjusting comprises the step of increasing an output power of the first base site to a level that produces a signal quality approximately equal to an average of a minimum acceptable signal quality and a maximum acceptable signal quality as measured by the second base site.

10. A method for a first base site of a plurality of base sites in a radio communication system to set an output power of the first base site, the method comprising the steps of:

transmitting a signal via a radio communication resource;

receiving, responsive to said transmission, a message from a second base site of the plurality of base sites; and adjusting, responsive to said message, the output power of the first base site.

11. The method of claim 10, wherein the step of adjusting comprises the step of increasing an output power of the first base site to a level that produces a signal quality approximately equal to an average of a minimum acceptable signal quality and a maximum acceptable signal quality as measured by the second base site.

12. The method of claim 10, wherein the step of adjusting comprises the step of decreasing the output power of the first base site, such that a received signal strength indication of a subsequent signal transmitted by the first base site is between a lower threshold value and an upper threshold value as measured by the second base site.

13. A method for a first base site of a plurality of base sites in a radio communication system to assist in setting an output power of a second base site of the plurality of base sites, the method comprising the steps of:

receiving a signal transmitted by the second base site to produce a received signal;

determining a signal quality metric of the received signal; and conveying a message to the second base site instructing the second base site to adjust an output power of the second base site, wherein content of the message is based on the signal quality metric.

14. The method of claim 13, wherein the step of conveying comprises the step of:

when the signal quality metric is indicative of undesirable signal quality, conveying a message to the second base site instructing the first base site to increase an output power of the second base site.

15. The method of claim 13, wherein the signal quality metric comprises a received signal strength indication.

16. The method of claim 15, wherein the step of conveying comprises the step of:

when the received signal strength indication is less than a lower threshold value, conveying a message to the second base site instructing the second base site to increase an output power of the second base site.

17. The method of claim 15, wherein the step of conveying comprises the step of:

when the received signal strength indication is greater than an upper threshold value, conveying a message to the second base site instructing the second base site to decrease the output power of the second base site, such that a received signal strength indication of a subsequent signal transmitted by the second base site is between a lower threshold value and an upper threshold value as measured by the first base site.

18. A radio communication system comprising:

a first base site having a radio transmitter for transmitting a signal at an output power level that is set in response to a control signal;

a second base site having a radio receiver for receiving the signal from the first base site to produce a received signal, and a controller for determining a signal quality metric of the received signal and generating the control signal based on the signal quality metric; and a communication path coupling the first base site to the second base site to enable the control signal to be conveyed from the second base site to the first base site.

19. The radio communication system of claim 18, wherein the communication path comprises a fixed infrastructure network.

20. The radio communication system of claim 18, wherein the communication path comprises a radio communication resource supported by the first base site.

* * * * *